United States Patent
Taralika et al.

(10) Patent No.: US 11,657,172 B2
(45) Date of Patent: *May 23, 2023

(54) POLICY-BASED MOBILE ACCESS TO SHARED NETWORK RESOURCES

(71) Applicant: EMC IP Holding Company LLC, Hopkinton, MA (US)

(72) Inventors: Anand Taralika, Sunnyvale, CA (US); Divakara Challa, Sunnyvale, CA (US); Srin Kumar, Sunnyvale, CA (US); Alok Ojha, San Jose, CA (US); Leonard Chung, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 428 days.

This patent is subject to a terminal disclaimer.

(21) Appl. No.: 16/865,140

(22) Filed: May 1, 2020

(65) Prior Publication Data
US 2020/0257772 A1 Aug. 13, 2020

Related U.S. Application Data

(63) Continuation of application No. 16/165,866, filed on Oct. 19, 2018, now Pat. No. 10,678,892, which is a continuation of application No. 14/743,152, filed on Jun. 18, 2015, now Pat. No. 10,140,430.

(60) Provisional application No. 62/079,887, filed on Nov. 14, 2014.

(51) Int. Cl.
*H04L 29/06* (2006.01)
*G06F 21/62* (2013.01)
*H04W 12/06* (2021.01)
*H04W 12/08* (2021.01)
*H04W 12/088* (2021.01)
*G06F 21/10* (2013.01)

(52) U.S. Cl.
CPC .......... *G06F 21/6218* (2013.01); *G06F 21/10* (2013.01); *H04W 12/06* (2013.01); *H04W 12/08* (2013.01); *H04W 12/088* (2021.01)

(58) Field of Classification Search
CPC ... H04W 12/06; H04W 12/08; H04W 12/088; G06F 21/10; G06F 21/6218
See application file for complete search history.

(56) References Cited

U.S. PATENT DOCUMENTS

| 8,537,385 B2 | 9/2013 | Iizuka |
| 2010/0081417 A1 | 4/2010 | Hickie |
| 2013/0219176 A1* | 8/2013 | Akella ................. G06F 16/185 713/165 |

(Continued)

*Primary Examiner* — Tri M Tran
(74) *Attorney, Agent, or Firm* — Krishnendu Gupta; Nikhil Patel

(57) ABSTRACT

Techniques to provide mobile access to content are disclosed. A request from a mobile application running on a mobile device to access content is received at a connector node. A user credential associated with the request is used to identify at the connector node a policy associated with the request. A policy metadata associated with the policy is provided from the connector node to the mobile application running on the mobile device. The mobile application may include application code that is responsive to the policy metadata to perform, with respect to the request to access content, an action indicated by the policy.

18 Claims, 9 Drawing Sheets

(56) References Cited

U.S. PATENT DOCUMENTS

| | | |
|---|---|---|
| 2014/0013444 A1 | 1/2014 | Gilchrist |
| 2014/0325627 A1 | 10/2014 | Fee |
| 2015/0095451 A1* | 4/2015 | Homsany ............... G06Q 10/10 709/217 |

* cited by examiner

POLICY-BASED MOBILE ACCESS TO SHARED NETWORK RESOURCES

CROSS REFERENCE TO OTHER APPLICATIONS

This application is a continuation of co-pending U.S. patent application Ser. No. 16/165,866, entitled POLICY-BASED MOBILE ACCESS TO SHARED NETWORK RESOURCES filed Oct. 19, 2018 which is incorporated herein by reference for all purposes, which claims priority to U.S. patent application Ser. No. 14/743,152, entitled POLICY-BASED MOBILE ACCESS TO SHARED NETWORK RESOURCES filed Jun. 18, 2015, now U.S. Pat. No. 10,140,430, which is incorporated herein by reference for all purposes, which claims priority to U.S. Provisional Application No. 62/079,887, entitled POLICY-BASED MOBILE ACCESS TO SHARED NETWORK RESOURCES filed Nov. 14, 2014 which is incorporated herein by reference for all purposes.

BACKGROUND OF THE TECHNOLOGY

Enterprise content typically resides in different places like end user devices, home directories, file shares, and Enterprise Content Management systems such as Microsoft's™ SharePoint™. Increasingly, business users have a need to access enterprise content via mobile devices. Unified mobile access to enterprise content residing in different places, such as end user devices, home directories, file shares, and SharePoint™ etc., may be needed by business users. Enterprises may desire to maintain control over the access via mobile devices of content that resides on an enterprise network.

BRIEF DESCRIPTION OF THE DRAWINGS

Various embodiments of the invention are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

A mobile solution to provide secure, unified access to network-based resources is disclosed. In various embodiments, a mobile app and associated infrastructure are used to provide secure access to network-based resources, such as files residing on end user devices on an enterprise or other network, home directories, files shares, and/or SharePoint-accessible content. In various embodiments, an administrator may configure one or more policies to be enforced with respect to mobile access to enterprise content. Policies may be enforced at one or more of three layers, e.g., the enterprise server, a secure connector to which the mobile device connects to access the enterprise server, and a mobile app running on the mobile device itself.

Figure 1:
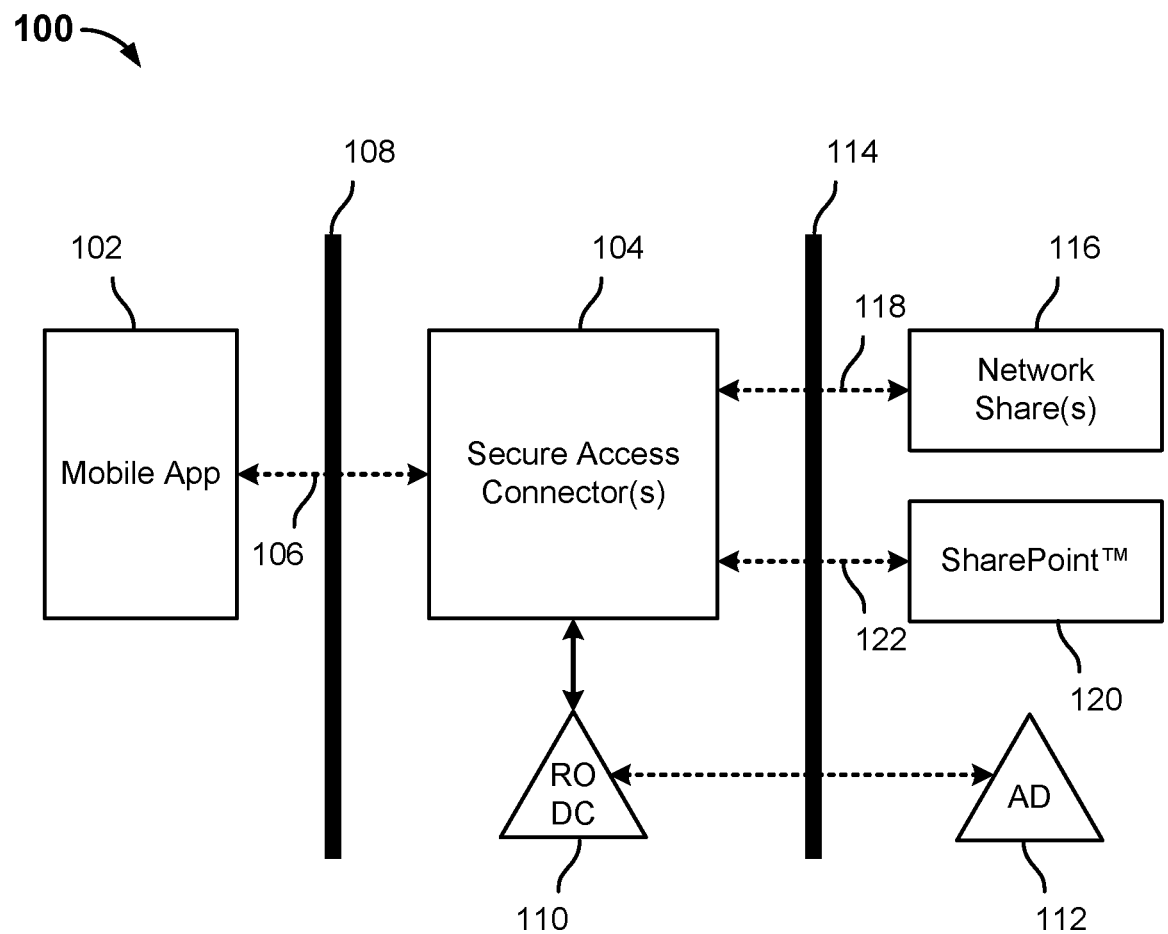
FIG. 1 is a block diagram illustrating an example embodiment of a system and architecture to provide secure mobile access to network resources.

FIG. 1 is a block diagram illustrating an example embodiment of a system and architecture to provide secure mobile access to network resources. In the example shown, the system and architecture 100 includes a mobile app 102 running on a mobile device, such as a mobile "smart" phone or tablet. The mobile app 102 in various embodiments provides secure mobile access to network resources, such as network shares and SharePoint™ libraries, by communicating via a connection 106 with one or more secure access connectors 104, e.g., using a proprietary or other API. In the example shown, the secure access connector(s) 104 are located behind a first firewall 108. A user may be authenticated using based on their enterprise network credentials (e.g., domain username and password), in this example by using an optional "read only" copy 110 of the enterprises Active Directory 112. In some embodiments, optional "read only" Active Directory copy 110 is included for security reasons.

Once authenticated, a user may access network resources, such as files or other content stored on servers that exist on an enterprise or other private network behind a second firewall 114.

For example, network shares 116 may be accessed via Server Message Block (SMB) or other protocol communications sent via a connection 118. The user's enterprise network credentials may be presented to gain such access, enabling the file or other servers on which shared resources are stored to enforce access control list (ACL) based or other access controls with respect to requested resources. For example, a user who is afforded only "read only" access to a requested file may be permitted to open a "read only" copy of the file, but would not be permitted to update the file as store on the file server.

In various embodiments, secure mobile access to home directories, file shares, etc. may be provided with respect to any storage that supports the Server Message Block (SMB) protocol, such as EMC Isilon™ and VNX™ storage products. Users can create, edit and save files on the network share from their mobile devices. Users can also mark files for offline access.

Similarly, access to content accessible via SharePoint 120, such as SharePoint 2010 and SharePoint 2013 sites, subsites and document libraries, may be provided via communications between the secure access connector(s) 104 and SharePoint 120 via a connection 122, e.g., using the SharePoint API, for example.

In some embodiments, metadata reflecting the requesting user's rights with respect to a file or other object may be provided to the secure access connector(s) 104 and/or mobile app 102 to enable a user experience that is consistent with the user's access rights to be provided. For example, if the user has only "read only" rights, the file may be opened and displayed by mobile app 102 on the mobile device using a "viewer" or other interface (e.g., app) that does not provide an ability to edit. As another example, if SharePoint 120 requires the user to check out a file before being able to edit and the file has not (yet) been checked out by the user, the mobile app 102 may display the content in a viewer, as opposed to an app that provides the user with the ability to edit the content.

In various embodiments, users access their network shares using their Windows Domain credentials. The secure credential technology makes all subsequent access seamless with behind the scenes authentication. An administrator console enables administrators to configure and/or publish network shares, manage users and groups, and configure mobile device policies.

In various embodiments, mobile app 102 enables SharePoint documents to be created, edited, and saved from mobile devices. In addition, in some embodiments mobile app 102 supports SharePoint specific functionality like check-in and check-out of documents. Users can also mark files for offline access.

In some embodiments, an administrator may configure one or more mobile access policies to be enforced at secure access connector(s) 104, such as to limit access based on user, device, time of day, location, etc.

In some embodiments, an administrator may configure secure access connector(s) 104 and/or mobile app 102 to provide access via mobile app 102 to shared content in a manner determined at least in part based on policies stored and enforced at secure access connector(s) 104. For example, in some embodiments an administrator may define one or more policies that specify "bookmarks" or other data identifying a subset of shared content that is to be made available via mobile app 102. For example, a user's credentials may be used to determine, based on one or more policies, a subset of resources that would be available to the user if logged in to the network directly (e.g., on premises, via VPN), and access to only that subset of resources would be made available via mobile app 102. Policies may be defined by user, group, or other user association. Such an approach in various embodiments enables the user to be presented via mobile app 102 only with those shared resources that the user is most likely to desire to have mobile access, enabling a representation of only that subset of content to be displayed in a navigable interface of mobile app 102, for example. This approach may enable the user to have more meaningful and quick access to such content, since the desired content will not be obfuscated, at least potentially, by shared content to which the user is not likely to want to have access via mobile app 102.

Figure 2:
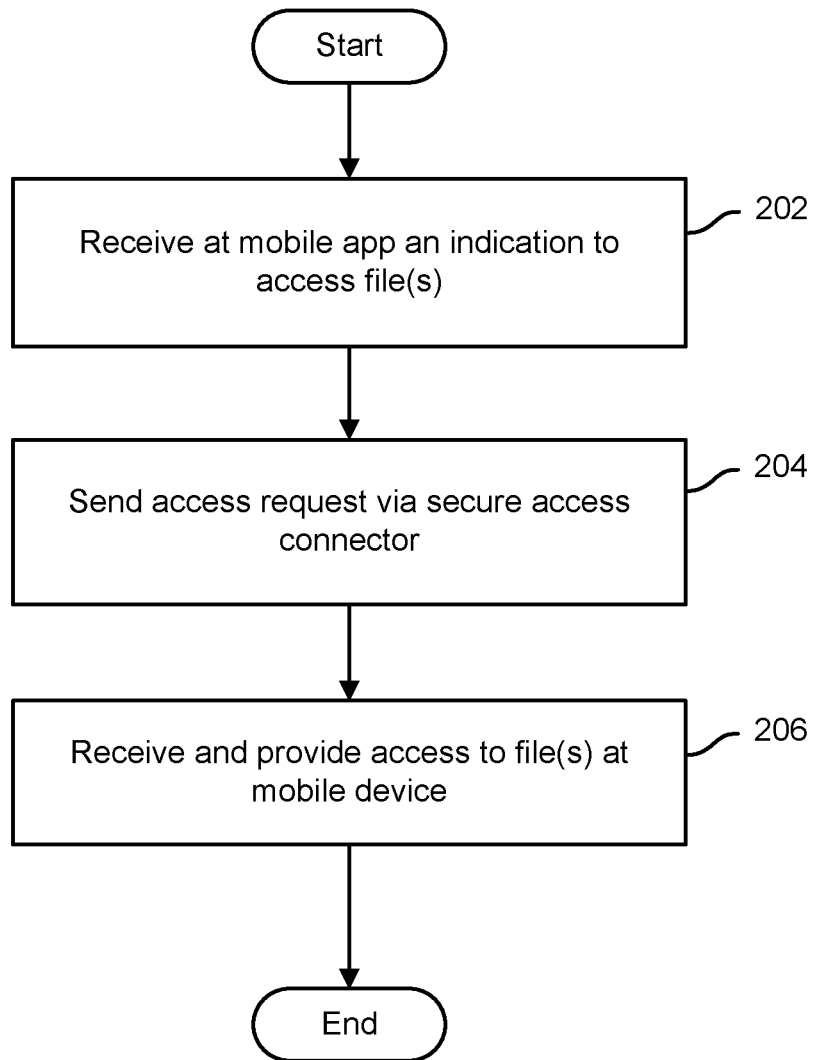
FIG. 2 is a flow chart illustrating an example embodiment of a process to access files on an enterprise or other internal network.

FIG. 2 is a flow chart illustrating an example embodiment of a process to access files on an enterprise or other internal network. In various embodiments, the process of FIG. 2 may be implemented by a mobile device and/or a mobile app running on a mobile device, such as mobile app 102 of FIG. 1. In the example shown, an indication is received at a mobile app to access one or more files stored on an enterprise or other remote, non-public network (202). For example, a user of a mobile device may have launched a mobile app, such as mobile app 102, associated with accessing content on the enterprise network, and indicated a desire to access specific content, such as by selecting at the mobile device, via a user interface, a representation of file, folder, or other logical container. An access request is sent via a secure access connector to obtain access to the file or other content (204). For example, a mobile app such as mobile app 102 of Figure may send a request via secure access connector(s) 104 to access a network share on network shares 116 of FIG. 1 or a SharePoint™ content stored on SharePoint™ server 120. The requested files/folder(s) are received at the mobile device and access is provided (206), e.g., via a navigation interface, a viewer, and/or a content creation/editing app or other interface.

In various embodiments, access may be provided in a manner indicated by one or more of an access privilege of a user of the mobile device with respect to the content and/or one or more policies stored at the secure access connector. For example, metadata reflecting one or both of the access privilege(s) and the applicable policy(ies), if any, may be sent down to the mobile device, and a behavior of the mobile app with respect to the content may be determined at least in party by such metadata. For example, content to which the user has "read only" access may be displayed by the mobile app in a viewer interface, not an editing interface. Or, in another example, a policy reflecting a time of day, geolocation, or other restriction on mobile access to the content may be indicated by the metadata and enforced by the mobile app.

Figure 3:
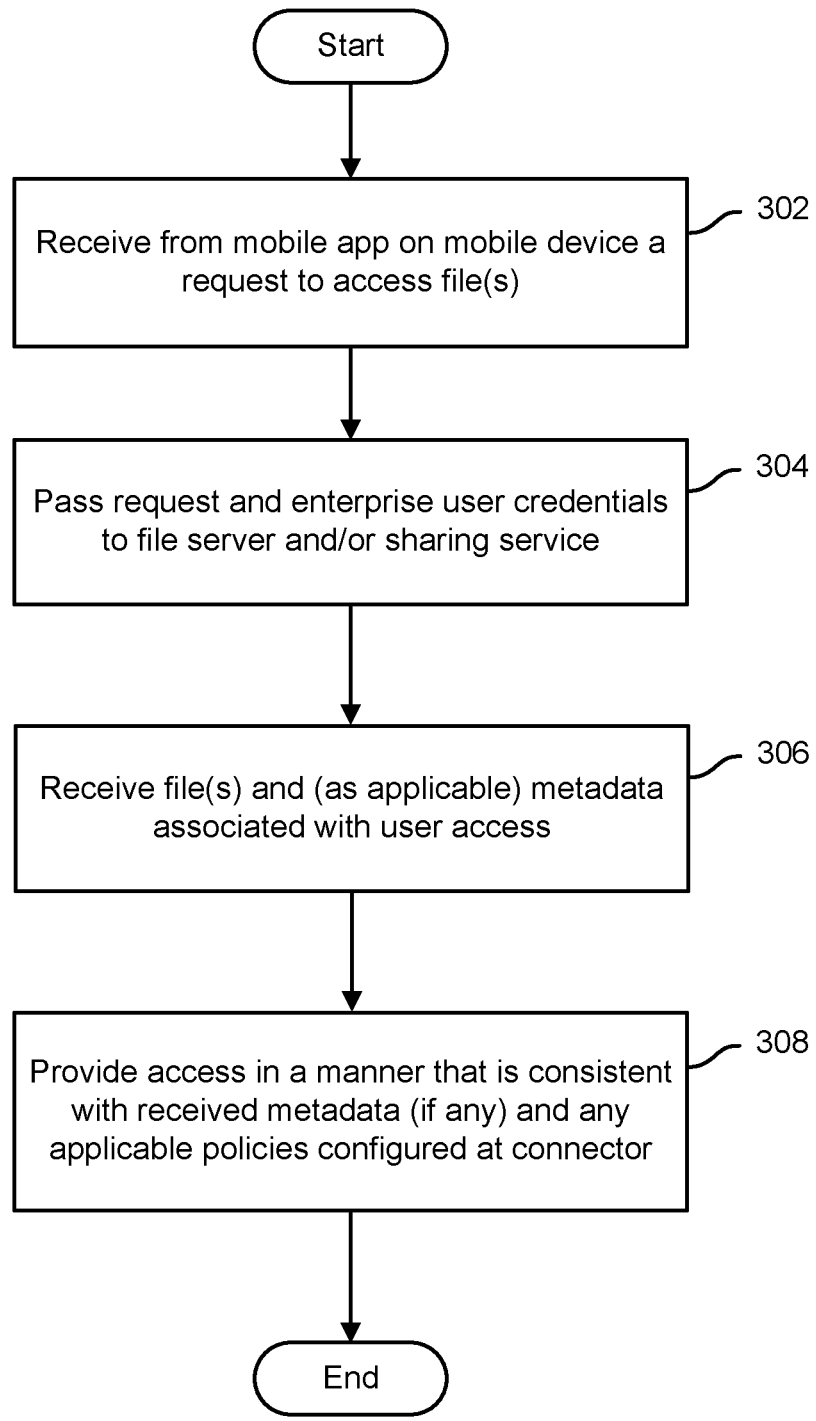
FIG. 3 is a flow chart illustrating an example embodiment of a process to provide access to files on an enterprise or other internal network.

FIG. 3 is a flow chart illustrating an example embodiment of a process to provide access to files on an enterprise or other internal network. In various embodiments, the process of FIG. 3 may be implemented by a secure access connector configured to enable mobile devices to connect to and obtain files or other resources from servers on an enterprise or other non-public network, such as secure access connector(s) 104 of FIG. 1. In the example shown, a request to access content stored on an enterprise network is received from a mobile device (302). In the case of a first access request, the request may include user credentials associated with the request. The request and enterprise user credentials associated with the request are passed to the file server or other service with which the request is associated (304). In some embodiments, the user credentials may be embodied in a secure token that is stored at the secure connector and/or at the mobile device, and which is presented to enterprise services to authenticate the user, without requiring that the user present the user's credential to multiple services. The requested file(s) and, if applicable, associated metadata are received at the secure connector (306). For example, a requested file along with metadata indicating that the requesting user has "read only" access to the file may be received. Access to the file or other content is provided, via the mobile app on the mobile device, in a manner indicated by the metadata, if any, and/or any policies the secure connector may have been configured to enforce (308). For example, if the metadata from the server indicated the user had read only access, the content may be provided to a viewer app on the mobile device, or provided to the requesting app with metadata indicating access is limited to read only access. Or, in another example, if access is limited to a certain geography, metadata defining that restriction may be provided to the mobile app, which in various embodiments may be configured to read the metadata, interpret the metadata to determine the restriction(s) to be enforced, and enforce the restriction(s).

Figure 4:
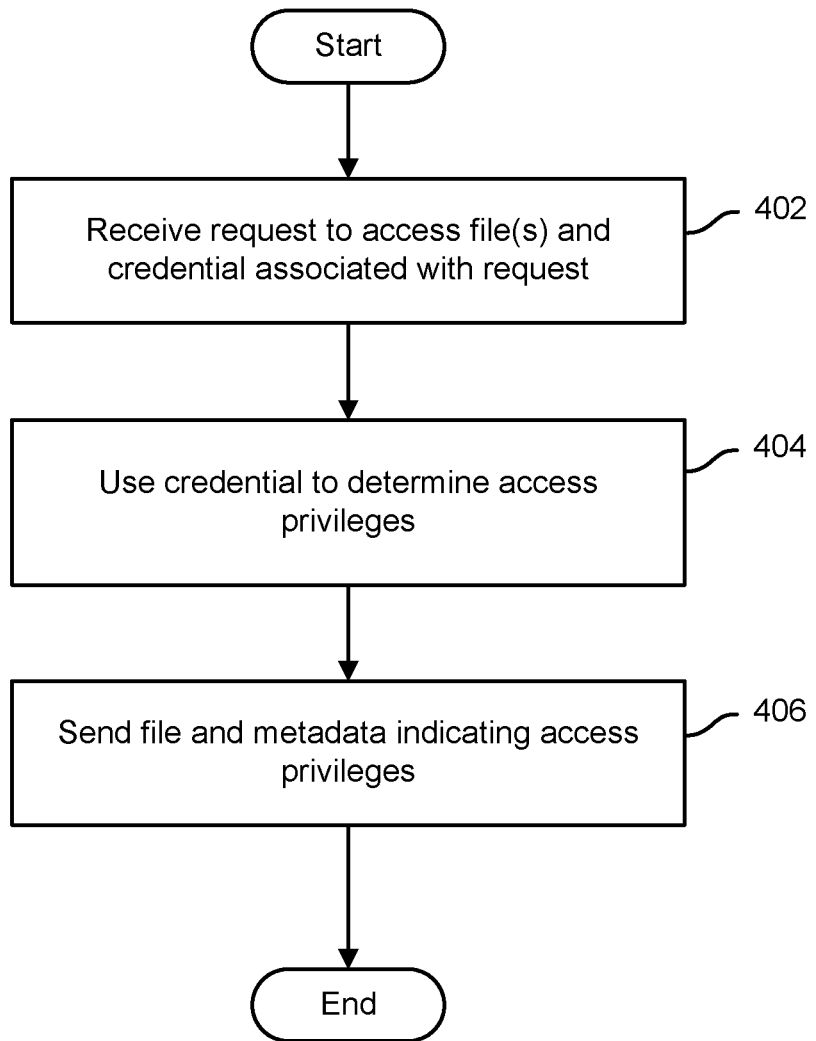
FIG. 4 is a flow chart illustrating an example embodiment of a process to provide access to files.

FIG. 4 is a flow chart illustrating an example embodiment of a process to provide access to files. In various embodiments, the process of FIG. 4 may be implemented by an enterprise network server, such as network share(s) 116 and/or SharePoint™ server 120 of FIG. 1. In the example shown, a request to access content is received, along with a secure token or other representation of user credentials associated with the request (402). The user credentials are used to determine the requesting user's access privileges with respect to the requested content (404). For example, the server processing the request may use the credentials and an access control list (ACL) or other set of access privilege data to determine the user's privileges. The requested file(s) or other content and metadata indicating the user's access privileges with respect to the content are returned in a response to the request (406). As noted above, in various embodiments one or both of the secure access connector and the mobile app may be configured to enforce the access privilege based at least in part on the metadata included in the response.

Figure 5:
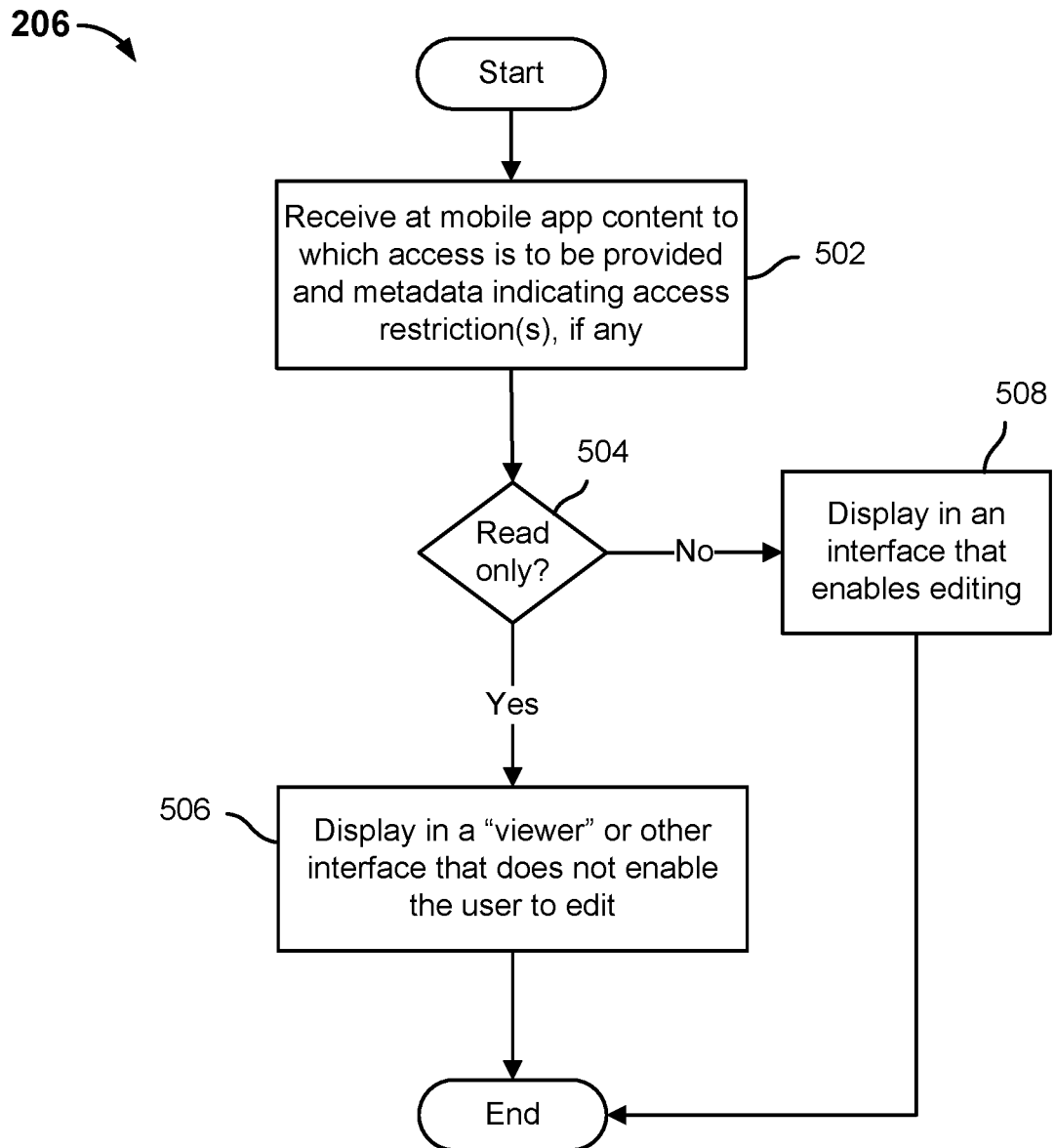
FIG. 5 is a flow chart illustrating an example embodiment of a process to provide access to files in a manner consistent with an access privilege.

FIG. 5 is a flow chart illustrating an example embodiment of a process to provide access to files in a manner consistent with an access privilege. In various embodiments, the process of FIG. 2 may be implemented by a mobile device and/or a mobile app running on a mobile device, such as mobile app 102 of FIG. 1. In some embodiments, step 206 of the process of FIG. 2 may include the process of FIG. 5. In the example shown, content to which access is to be provided is received by a mobile app, along with associated metadata indicating access restrictions/privileges, if any (502). If the metadata indicates the user is limited to "read only" access (504), the content is displayed in a viewer or other app that does not enable a user to edit (506). If the user is not limited to read only access to the content (504), the content is displayed in an app or interface that enables the user to edit the content (508).

Figure 6:
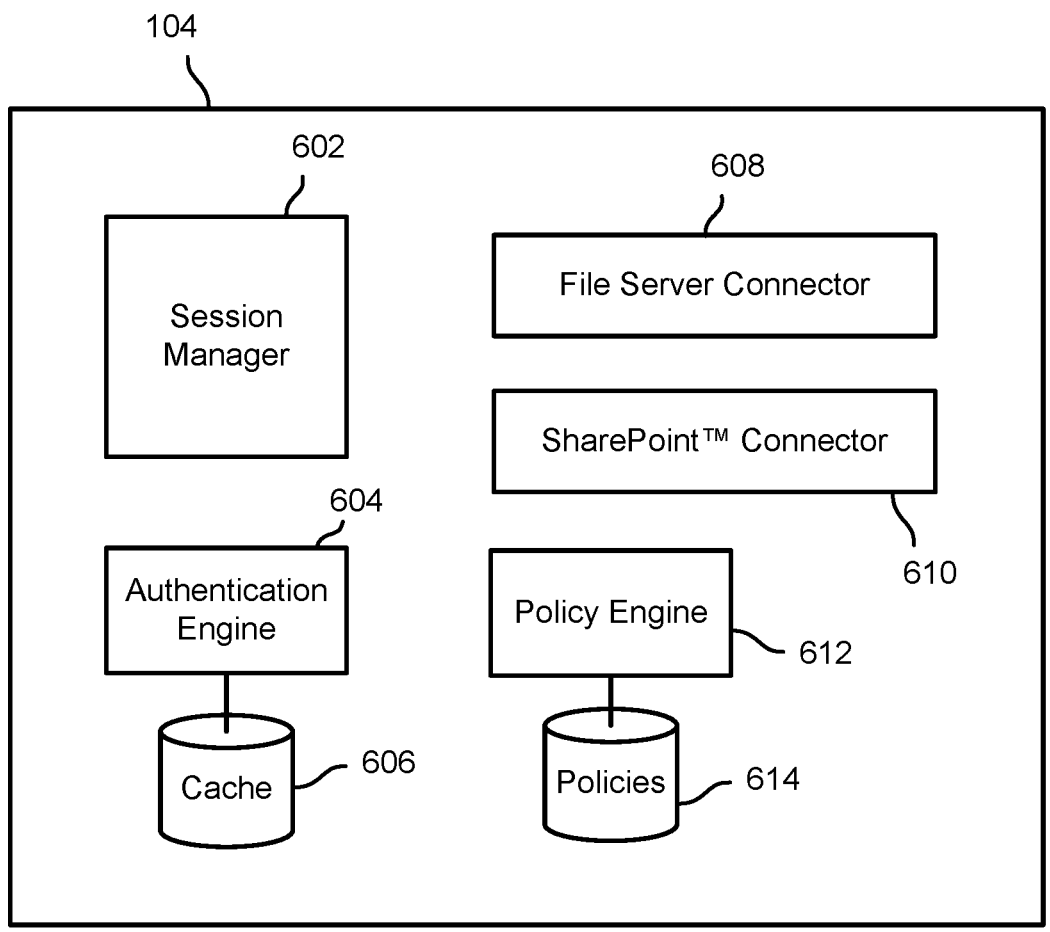
FIG. 6 is a block diagram illustrating an example embodiment of a secure access connector system.

FIG. 6 is a block diagram illustrating an example embodiment of a secure access connector system. In various embodiments, the system of FIG. 6 may be used to implement a secure access connector(s) 104 of FIG. 1. In the example shown, the secure access connector 104 includes a session manager 602 configured to manage session-based connections between each of one or more mobile devices and the secure access connector 104. An authentication engine 604 receives a user credential, e.g., a fully-qualified user name and an associated password, and stores the credentials in a secure token in a local cache or other in memory store 606. In various embodiments, once a user has provided the user's credentials once, at initial log in, access is provided to services on the enterprise network using the user's credentials as stored at the secure access connector, e.g., in cache 606. In this example, the secure access connector system 104 includes a service-specific connector for each service to which access is provided. In the example shown, a file sharing service connector 608 and a SharePoint™ connector 610 are included.

A policy engine 612 enforces policies stored in a policy data store 614. In various embodiments, an administrative interface not shown in FIG. 6, such as a web-based or other network-access interface, is provided and used by a network administrator to define policies and deploy them to be stored in policy data store 614 and enforced by policy engine 612. In various embodiments, policies may be enforced by the secure access connector, e.g., by adjusting the behavior of the connectors 608, 610 or other components of the secure access connector system 104, and/or by providing instructions to the mobile device, such as in the form of metadata sent to the mobile device in connection with providing content requested by the device.

In various embodiments, a wide range of policies may be configured and enforced. In one example, a policy may be set to facilitate convenient access to content at mobile devices. For example, an enterprise may wish to provide for the convenience of mobile device users of the enterprise a default set of bookmarks to content on the enterprise network, with the bookmarks provided to a given user being determined based on a user's group affiliation or other attributes. For example, user attributes read from an Active Directory or other directory, as described herein, may be used to determine a set of bookmarks to provide to a particular user. For example, in a university setting, faculty may receive one set of bookmarks, administrators another, and students yet another. Similarly, the bookmarks provided may depend on the school or department with which a user is associated, e.g., computer science, mechanical engineering, history, etc. In various embodiments, when a user logs in, the user's credentials may be used to determine the user's group affiliations or other attributes. The attributes on which the bookmark (or other applicable) policy depends may be used to determine the appropriate behavior to provide and/or enforce. For example, a set of bookmarks for a student in the mechanical engineering department may be determined and pushed down to the mobile device. A mobile app on the mobile device may be configured to respond to the information by displaying the appropriate bookmarks, which may involve obtaining file/folder metadata from applicable resources on the university (or other enterprise) network. User requests to access content that are indicated by interacting with the bookmarks may be fulfilled as disclosed herein.

Figure 7A:
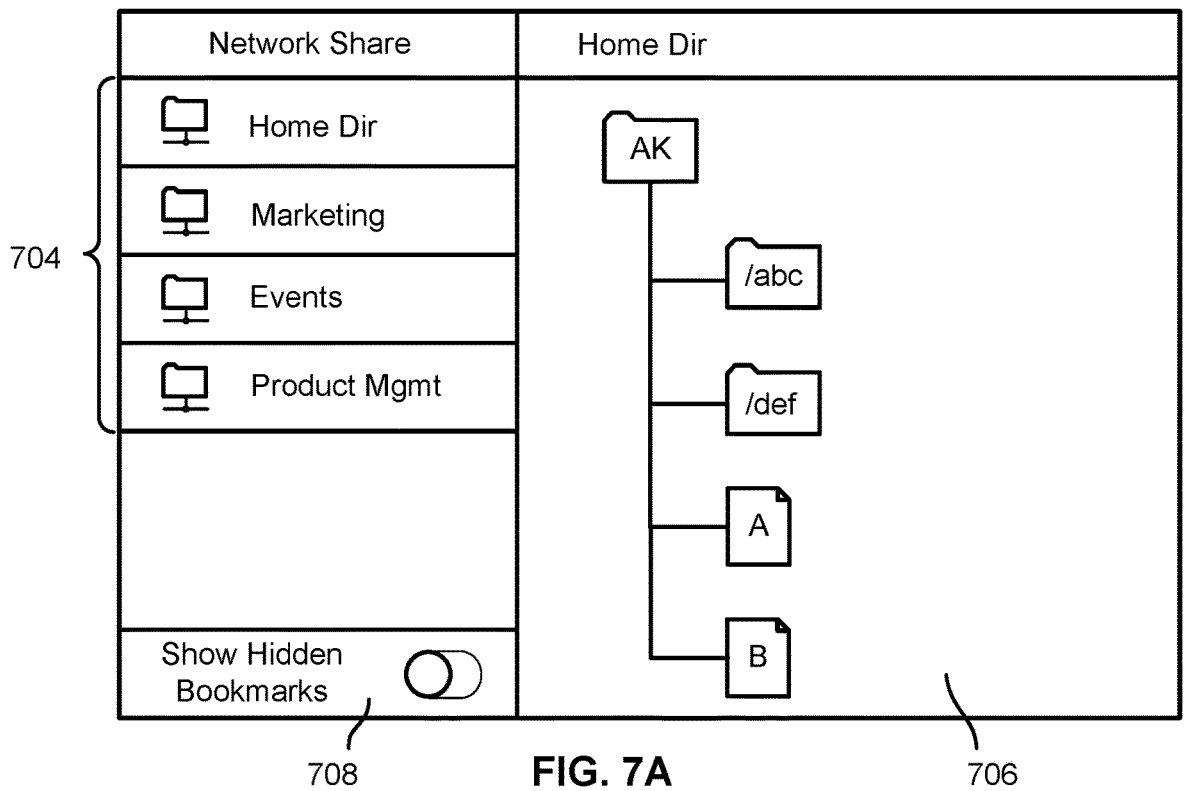
FIG. 7A is a block diagram illustrating an example of a bookmarked content navigation mobile interface in an embodiment of a system to provide policy-based mobile access to enterprise content.

FIG. 7A is a block diagram illustrating an example of a bookmarked content navigation mobile interface in an embodiment of a system to provide policy-based mobile access to enterprise content. In various embodiments, the content navigation interface of FIG. 7A may be provided by a mobile app, such as mobile app 102 of FIG. 1, based at least in part on a bookmark policy set by a network/IT administrator, such as a policy stored in policy data store 614 of FIG. 6. In the example shown, the bookmarked content navigation mobile interface includes a set of bookmarks 704. In the state shown in FIG. 7A, a first one of the bookmarks has been selected, as indicated by the text "Home Dir" in the right-hand side of the top bar. As a result, a folder/file hierarchy comprising content items associated with the bookmark "Home Dir" are shown in a folder/file display pane 706. In various embodiments, selection of a folder displayed in folder/file display pane 706 may result in the folder being opened and a representation of its contents displayed in folder/file display pane 706. In various embodiments, selection of a file displayed in folder/file display pane 706 may result in the file being downloaded and displayed. For example, a selected file may be displayed in a viewer, if the user has only "read only" privileges with respect to the content, or in an editing interface if the user has editing privileges.

In various embodiments, an administrator may configured a bookmark policy, e.g., at a secure access connector such as secure access connector 104 of FIG. 1 and/or FIG. 6. For example, the bookmarks shown in FIG. 7A may have been determined at least in part, or at least initially (e.g., prior to user customization) based on such a policy. For example, the administrator may have defined a bookmark policy indicating that the bookmarks shown in FIG. 7A should be set (at least initially) for a user who is determined, e.g., based on Active Directory or other enterprise directory information available to the secure access connector, to be a member of the "Marketing" department. A user in the "Engineering" department, by contrast, may receive a different set of pre-defined bookmarks, as indicated in the bookmark policy. In various embodiments, providing bookmarks configured by policy make content that may be expected to be most useful or of interest to a given user or group of users available via a mobile-friendly interface. Specifically, since a phone or tablet display typically is much smaller than a desktop or even a laptop computer screen, bookmarks configured by policy may enable the most useful content to be represented in a way that makes the most efficient use of the limited display space that is available.

In various embodiments, a user may customize the bookmarks that have been configured to be provided to the user, at least initially, by a policy defined at a secure access connector. For example, in the example shown in FIG. 7A a "show hidden bookmarks" control 708 is provided to enable bookmarks previously hidden from view based on a user input from the user to be shown. For example, if the user rarely used the "Product Mgmt" bookmark shown among the bookmarks 704 in the example shown FIG. 7A, in various embodiments a user would be provided an interface or control to hide that bookmark (see FIG. 7B and description below), and in some such embodiments activation of the "show hidden bookmarks" control 708 would result in the previously hidden bookmark being display, such as to enable the user to retrieve associated content in a relatively rare occasion when such access may be desired.

Figure 7B:
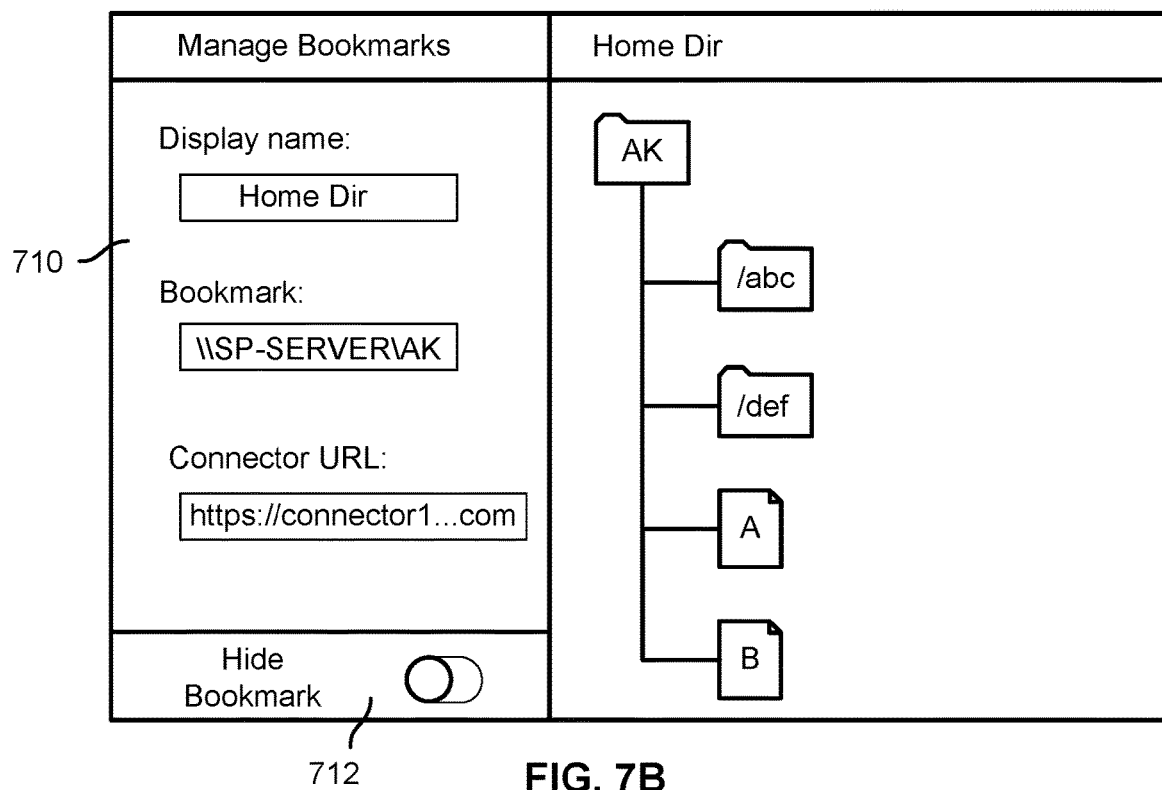
FIG. 7B is a block diagram illustrating an example of a bookmark management interface in an embodiment of a system to provide policy-based mobile access to enterprise content.

FIG. 7B is a block diagram illustrating an example of a bookmark management interface in an embodiment of a system to provide policy-based mobile access to enterprise content. In various embodiments, the bookmark management interface of FIG. 7B may be provided by a mobile app, such as mobile app 102 of FIG. 1, e.g., to enable a user to see and if permitted modify a bookmark created automatically based on a bookmark policy set by a network/IT administrator, such as a policy stored in policy data store 614 of FIG. 6. In the example shown, an interface to manage or control bookmarks has been accessed, e.g., by a user gesture such as swiping or sliding a bookmark to the left, touching and holding the bookmark, etc., in an interface such the one shown in FIG. 7A. In the example shown in FIG. 7B, the bookmark "Home Dir" (i.e., the user's home directory) has been opened in the management interface shown. In a bookmark information/definition pane 710, the underlying information defining the bookmark is displayed, each attributed being shown in an editable text box interface, for example to enable the information to be customized (e.g., changing the display name to a custom name) and/or to update or manually configure information required to connect to the enterprise or other server at which the content resides. In the example shown, in addition to the "display name" used to represent the bookmark on the mobile device (e.g., as in FIG. 7A), the location of the folder/directory corresponding to the bookmark, in this example a Universal Naming Convention (UNC) or other path name and the URL needed to establish a connection via a secure access connector as described herein as shown as being displayed and, in some embodiments, subject to being changed in bookmark information/definition pane 710. In the example shown, a "hide bookmark" control 712 is provided, e.g., to enable the user to indicate that the policy-defined bookmark should be "hidden", i.e., not displayed in an interface such as the one shown in FIG. 7A unless the "show hidden bookmarks" control is selected.

In some embodiments, whether and/or the extent to which a user is permitted to make changes via an interface such as the bookmark management interface of FIG. 7B may be defined in the bookmark policy by which the initial set of bookmarks was created. For example, the policy may indicate that a subset of bookmarks is required and/or cannot be changed or hidden, while permitting changes to be made to other bookmarks in the set provided initially under the policy. The secure access connector may include in the bookmark information sent to the mobile device metadata indicating that bookmarks in the subset are "locked" by policy, and the mobile app or other code provided on the mobile device to render the bookmark interface, e.g., FIGS. 7A and 7B, may be configured to enforce the lock by preventing changes to attributes of bookmarks in the required subset.

Figure 8:
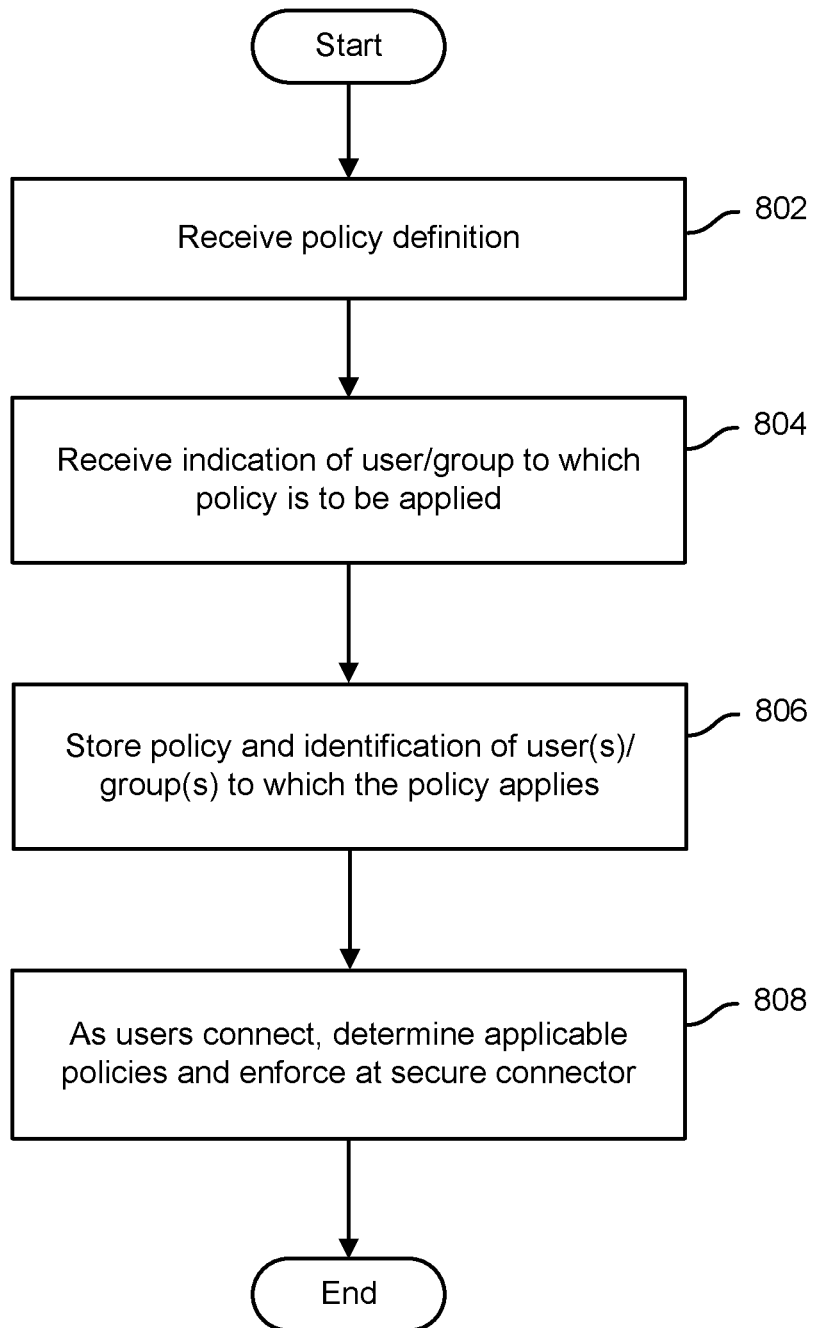
FIG. 8 is a flow chart illustrating an example embodiment of a process to provide policy-based access to network-based content.

FIG. 8 is a flow chart illustrating an example embodiment of a process to provide policy-based access to network-based content. In various embodiments, the process of FIG. 8 may be used to receive a definition of and enforce one or more policies with respect to mobile access to content stored on an enterprise network. Policies defined via the process of FIG. 8 may be deployed in various embodiments by adding such policies to a policy data store, such as policy data store 614 of FIG. 6. In the example shown in FIG. 8, a policy definition is received (802), e.g., via a policy definition administrative user interface. An indication of which user(s) and/or group(s) of users are subject to the policy is received (804). The policy and the user(s)/group(s) to which the policy is to be applied are stored (806), e.g., in a policy data store, such as policy data store 614 of FIG. 6. As users connect, e.g., via a secure access connector such as connector 104 of FIGS. 1 and/or 6, for each user the policy(ies) applicable to that user are determined and are enforced with respect to that user (808).

In various embodiments, policies may be enforced by configuring a mobile app at the mobile device to exhibit and/or enforce a behavior required by a policy and/or by modifying or controlling the behavior of the secure access connector, or both.

Figure 9:
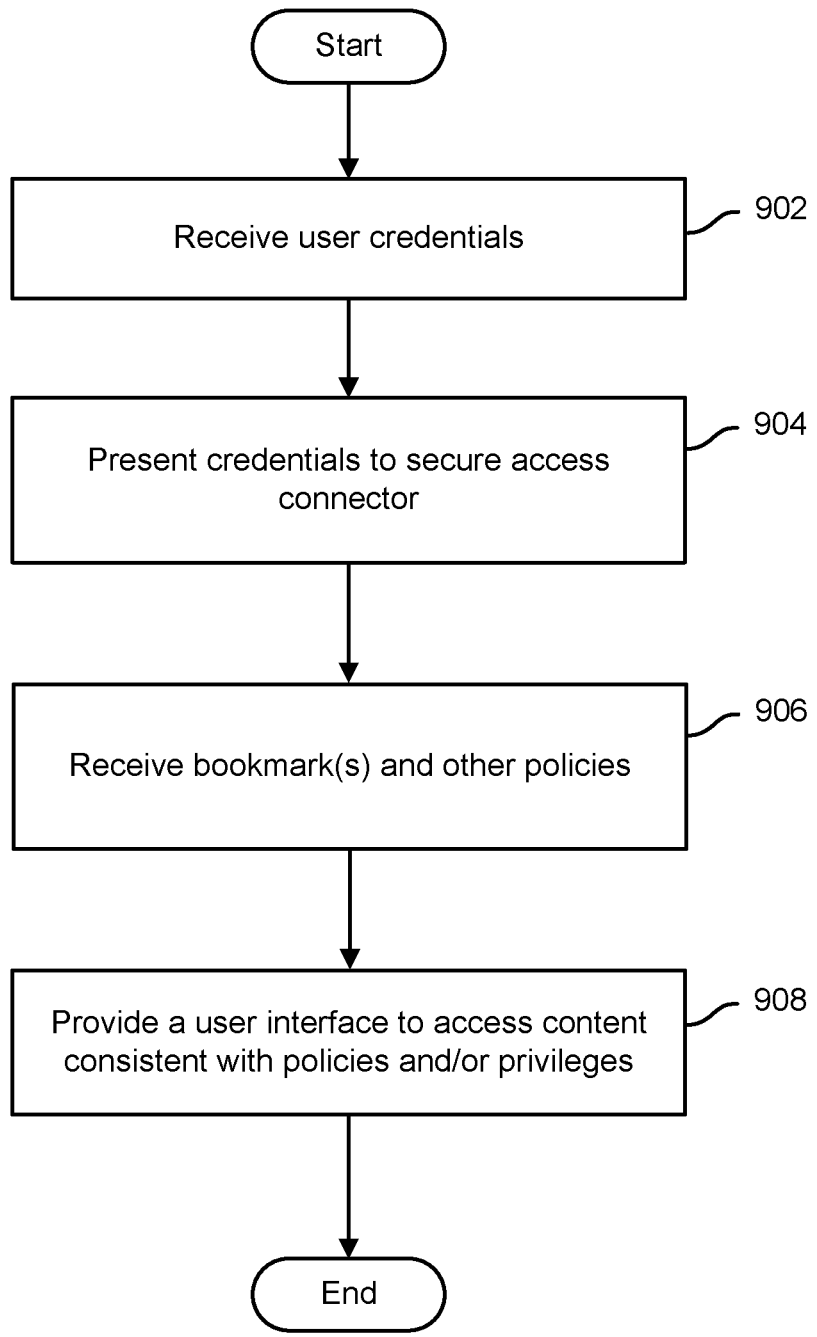
FIG. 9 is a flow chart illustrating an example embodiment of a process to provide access to files in a manner indicated by a policy.

FIG. 9 is a flow chart illustrating an example embodiment of a process to provide access to files in a manner indicated by a policy. In various embodiments, the process of FIG. 9 may be implemented by a mobile device and/or a mobile app running on a mobile device, such as mobile app 102 of FIG. 1. In the example shown, user credentials are received (902), e.g., via a log in interface displayed by a mobile app configured to perform the process of FIG. 9. The credentials are presented to a secure access connector (904), e.g., one to which the mobile device and/or a mobile app running thereon may be configured to connect. One or more bookmark policies and/or other policies to be enforced at the mobile device are received (906). A mobile user interface is provided to access content in a manner that is consistent with the received policies and, as applicable, the access privileges associated with the user credentials with respect to specific items and/or collections of content (908). For example, a set of bookmarks such as bookmarks 704 of FIG. 7A may be displayed in response to a bookmark policy received from the secure access connector.

In various embodiments, techniques described herein may be used to provide secure mobile access to content with three layers of protection for enterprise or other protected content, i.e., at the enterprise or other internal server (by providing access based on enterprise user credentials and privileges, e.g., as determined based on the same ACL's or other mechanisms used to control access from within the protected network); at the secure access connector disclosed herein; and/or at the mobile device itself, e.g., by configuring the mobile app to enforce one or more policies received from the secure access connector.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method to provide mobile access to content, comprising:
   receiving, by a connector node, a request for content from a mobile device; and
   in response receiving the request for content,
   determining, by the connector node, a policy associated with the request for content, wherein the policy is determined based at least in part on a user credential associated with the request for content, and the policy indicates a subset of resources for which the mobile device is permitted to access if a corresponding access request is communicated by a mobile application for which a secure connection is established between the mobile device and corresponding one or more content repositories or one or more content management systems, and wherein the policy comprises a bookmark policy that identifies an initial set of bookmarks configured based at least in part on a user associated with the user credential;
   obtaining, by the connector node, a policy metadata to be provided to the mobile device in connection with providing to the mobile device the content associated with the request for content, wherein the policy metadata is determined based at least in part on the user credential and the policy, and the policy metadata identifies one or more permitted actions with respect to the content;
   providing, by the connector node, the content associated with the request for content, the content being provided to the mobile device; and
   causing the policy metadata to be used in connection with the providing of the content.

2. The method of claim 1, wherein the request for content is communicated from a mobile application running on the mobile device, and the mobile application comprises application code that is responsive to the policy metadata to perform, with respect to the request for content, an action indicated by the policy.

3. The method of claim 1, further comprising:
   obtaining, by the connector node, the content associated with the request for content, the obtaining the content comprising determining the content based at least in part on an interest of a user associated with the mobile device or a group of users to which the user belongs, or historical information pertaining to user preferences for the user or the group of users.

4. The method of claim 1, wherein the connector node is configured to facilitate access by a mobile application running on the mobile device to one or more servers comprising an enterprise or other non-public network.

5. The method of claim 1, further comprising:
   authenticating a user associated with a mobile device based at least in part on one or more credentials.

6. The method of claim 1, wherein the request for content includes a user credential.

7. The method of claim 6, wherein the user credential comprises a user name and a password.

8. The method of claim 1, wherein the policy is identified at least in part by using a user credential to retrieve user attribute information from a directory, and the user credential is obtained by the connector node in connection with the request for content.

9. The method of claim 8, wherein the policy is identified based at least in part on an association between one or more user attributes comprising the user attribute information and the policy.

10. The method of claim 1, wherein a mobile application running on the mobile device is responsive to the policy metadata to obtain and display to a user of the mobile device a bookmarked content navigation interface that includes one or more bookmarks, each of which may be selected by the user to access a corresponding bookmarked content that reside on a server to which the connector is configured to provide access.

11. The method of claim 10, wherein the bookmarked content navigation interface provides an ability for a user to customize the interface to an extent permitted by the policy.

12. The method of claim 1, wherein the policy comprises a restriction on access to a restricted content based on one or more of time of day, day of the week, location, and other mobile device context data, and the mobile application is responsive to the policy metadata to enforce the restriction on access with respect to the restricted content.

13. The method of claim 1, wherein the connector node is configured to perform at the connector node an enforcement action associated with the policy.

14. The method of claim 1, wherein the initial set of bookmarks indicates content that is expected to be useful to the user.

15. The method of claim 1, wherein the initial set of bookmarks is a default set of bookmarks that is determined based at least in part on a group affiliation of the user.

16. The method of claim 1, wherein the policy is enforced at least at the connector node that operatively connects the mobile device to the corresponding one or more content repositories or one or more content management systems.

17. A system to provide mobile access to content, comprising:
   a physical communication interface; and a hardware processor coupled to the communication interface and configured to:
  receive, via the communication interface, request for content from a mobile device; and
  in response receiving the request for content; and
  in response to the connector node receiving the request for content,
  determine, by the connector node a policy associated with the request for content, wherein the policy is determined based at least in part on a user credential associated with the request for content, and the policy indicates a subset of resources for which the mobile device is permitted to access if a corresponding access request is communicated by a mobile application for which a secure connection is established between the mobile device and corresponding one or more content repositories or one or more content management systems, and wherein the policy comprises a bookmark policy that identifies an initial set of bookmarks configured based at least in part on a user associated with the user credential;
  obtain, by the connector node, a policy metadata to be provided to the mobile device in connection with providing to the mobile device the content associated with the request for content, wherein the policy metadata is determined based at least in part on the user credential and the policy, and the policy metadata identifies one or more permitted actions with respect to the content;
  provide, by the connector node, the content associated with the request for content, the content being provided to the mobile device; and
  cause the policy metadata to be used in connection with the providing of the content.

18. A computer program product, the computer program product being embodied in a non-transitory computer-readable storage medium and comprising computer instructions for:
  receiving, by a connector node, a request for content from a mobile device; and
  in response receiving the access request,
  determining, by the connector node, a policy associated with the request for content, wherein the policy is determined based at least in part on a user credential associated with the request for content, and the policy indicates a subset of resources for which the mobile device is permitted to access if a corresponding access request is communicated by a mobile application for which a secure connection is established between the mobile device and corresponding one or more content repositories or one or more content management systems, and wherein the policy comprises a bookmark policy that identifies an initial set of bookmarks configured based at least in part on a user associated with the user credential;
  obtaining, by the connector node, a policy metadata to be provided to the mobile device in connection with providing to the mobile device the content associated with the request for content, wherein the policy metadata is determined based at least in part on the user credential and the policy, and the policy metadata identifies one or more permitted actions with respect to the content;
  providing, by the connector node, the content associated with the request for content, the content being provided to the mobile device; and
  causing the policy metadata to be used in connection with the providing of the content.

* * * * *